A. GORDON.
PRECIPITATION OF METALS FROM SOLUTIONS.
APPLICATION FILED FEB. 18, 1918.
1,323,588.                                        Patented Dec. 2, 1919.
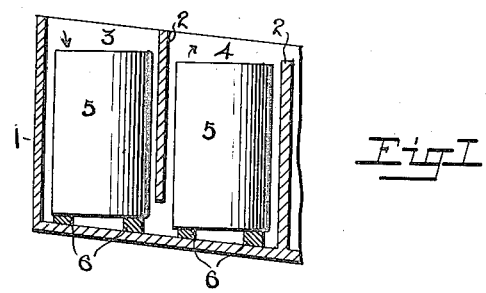
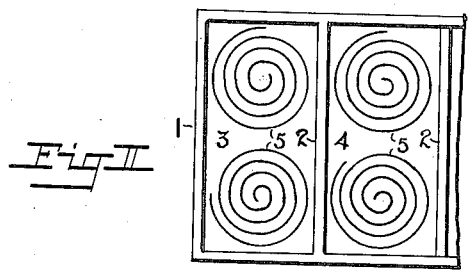
Inventor:
Arthur Gordon
per H. W. Plucker
Attorney.

UNITED STATES PATENT OFFICE.

ARTHUR GORDON, OF JOHANNESBURG, TRANSVAAL, SOUTH AFRICA.

PRECIPITATION OF METALS FROM SOLUTIONS.

1,323,588.  Specification of Letters Patent.  Patented Dec. 2, 1919.

Application filed February 18, 1918. Serial No. 217,974.

*To all whom it may concern:*

Be it known that I, ARTHUR GORDON, a subject of the King of Great Britain, residing at Johannesburg, in the Province of Transvaal, Union of South Africa, have invented certain new and useful Improvements in the Precipitation of Metals from Solutions, of which the following is a specification.

The present invention has reference to the precipitation of metals from their solutions and particularly the precipitation of gold and silver from their cyanid solutions.

Apparatus suitable for carrying out the invention is shown in the accompanying drawings in which—

Figure I is a vertical section of a precipitation box, and

Fig. II is a plan thereof.

According to this invention the precipitation is effected by bringing the solution into contact with an amalgamated aluminium body. This amalgam is conveniently prepared by dipping metallic aluminium into a solution of a mercury salt such as mercuric chlorid. A solution of one per cent. strength is suitable for this purpose.

The amalgamated aluminium liberates hydrogen directly from the water of the solution and this hydrogen in its nascent state precipitates the metal. The effect of the mercury is apparently to prevent the formation on the aluminium surface of a film of oxid which would stop further reaction between the water and the aluminium. The aluminium is converted into aluminium hydroxid which floats to the surface of the liquid. It thus has no tendency to foul the aluminium and can easily be removed if desired.

In practice it has been found best to flow the solution past thin amalgamated aluminium plates. It appears that the precipitation is increasingly vigorous as the thickness of the plate is reduced, apart from the surface exposed, and consequently the plates used are preferably as thin as possible consistent with their remaining mechanically strong for a reasonable time. Successful trials have been made with plates one-sixteenth of an inch thick. Shavings can be employed but their action is generally too vigorous.

Referring to the drawings, 1 indicates an ordinary precipitation box divided into compartments by partitions 2 which cause the solution to flow down through compartment 3, up through compartment 4, down through the next compartment and so on. In accordance with this invention, open rolls 5 of thin aluminium plate coated with mercury are stood upright on laths 6 on the floor of the box so that the solution can flow freely through them.

The gold or other metal is precipitated as a non-adherent powder which readily falls to the bottom of the precipitation vessel, thus leaving the aluminium mechanically free and being itself readily collected.

When precipitating from cyanid solutions it is desirable that free lime should be present in the solution. This of course is ordinarily present as protective alkali in working cyanid solutions, but in the present case the quantity may be increased with advantage to the rapidity of precipitation and also without the formation of detrimental precipitate which occurs when zinc is the precipitant.

Satisfactory results have been attained when using .04 per cent. of lime in the working solution as compared with .002 per cent. which was used with the same ore when zinc precipitation was employed.

The lime combines with the hydrocyanic acid liberated upon the release of the metal from the double cyanid solution. The calcium cyanid so formed remains in solution and is itself a solvent for gold and other metals so that there is no loss of available cyanid. The lime moreover has no effect on the aluminium or the aluminium hydroxid.

The present process differs essentially from the known process of precipitating silver by means of aluminium in the presence of caustic soda. In that case also the actual precipitant is nascent hydrogen, which however is produced by reaction between the aluminium and the sodium hydroxid. Sodium aluminate is produced and goes into solution; or, if lime is present, the calcium replaces the sodium and gelatinous calcium aluminate is precipitated on the aluminium. Moreover when it is attempted to precipitate gold by the said process, it is found that the gold plates the aluminium thus soon rendering it ineffective and leading to difficulties in smelting.

The action of the amalgamated aluminium is considerably more energetic than that of the zinc or zinc-lead couple usually employed in the cyanid process, consequently fewer precipitation boxes may be employed and weaker working solutions may be successfully treated.

I claim.

1. The process of precipitating metals from their solutions consisting in bringing the solutions in contact with an amalgamated aluminium body.

2. The process of precipitating precious metals from their solutions which consists in bringing said solutions into contact with an amalgamated aluminium body.

3. The process of precipitating metals from cyanid solutions which consists in bringing said solutions into contact with an amalgamated aluminium body.

4. The process of precipitating metals from cyanid solutions which consists in bringing said solutions into contact with an amalgamated aluminium body in the presence of an alkali earth.

5. The process of precipitating metals which consists in bringing a cyanid solution of the metal containing lime into contact with an amalgamated aluminium body.

6. The process of precipitating metals which consists in passing a weak solution of the metal over an amalgamated aluminium body in the presence of lime, thereby precipitating the metal as a non-adherent powder and producing aluminium hydroxid as a non-adherent floatable product.

7. The process of precipitating metals from their solutions which consists in flowing the solution past thin aluminium plates coated with mercury.

In testimony whereof I affix my signature.

ARTHUR GORDON.